United States Patent
Yuan et al.

(10) Patent No.: US 10,252,917 B2
(45) Date of Patent: *Apr. 9, 2019

(54) METHOD FOR PREPARING Y TYPE MOLECULAR SIEVE HAVING HIGH SILICA TO ALUMINA RATIO

(71) Applicant: DALIAN INSTITUTE OF CHEMICAL PHYSICS, CHINESE ACADEMY OF SCIENCES, Dalian (CN)

(72) Inventors: Danhua Yuan, Dalian (CN); Dawei He, Dalian (CN); Zhijia Song, Dalian (CN); Yunpeng Xu, Dalian (CN); Zhongmin Liu, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/505,176

(22) PCT Filed: Dec. 5, 2014

(86) PCT No.: PCT/CN2014/093181
§ 371 (c)(1),
(2) Date: Feb. 20, 2017

(87) PCT Pub. No.: WO2016/029591
PCT Pub. Date: Mar. 3, 2016

(65) Prior Publication Data
US 2017/0260059 A1    Sep. 14, 2017

(30) Foreign Application Priority Data
Aug. 28, 2014  (CN) .......................... 2014 1 0432992

(51) Int. Cl.
C01B 39/24       (2006.01)
C01B 39/20       (2006.01)

(52) U.S. Cl.
CPC ............ C01B 39/24 (2013.01); C01B 39/205 (2013.01); *C01P 2002/72* (2013.01); *C01P 2002/86* (2013.01); *C01P 2004/03* (2013.01)

(58) Field of Classification Search
None
See application file for complete search history.

(56) References Cited

FOREIGN PATENT DOCUMENTS

| CN | 1746110 A | 3/2006 |
|---|---|---|
| CN | 1951812 A | 4/2007 |
| CN | 1951813 A | 4/2007 |
| CN | 101549874 A | 10/2009 |
| CN | 101870478 A | 10/2010 |

OTHER PUBLICATIONS

Examination Report dated Jun. 29, 2017 for related Australian Patent Application No. 2014404762 by Australian Intellectual Property Office.
Examination Report dated Nov. 18, 2017 for related Australian Patent Application No. 2014404762 by Australian Intellectual Property Office.
Supplemental European Search Report Report dated Feb. 8, 2018 for related European Patent Application No. 14900724.7 by European Patent Office.
Dawei He et al: "Hydrothermal synthesis of high silica zeolite Y using tetraethylammonium hydroxide as a structure-directing agent", Chemical Communications, vol. 52, No. 86, Sep. 26, 2016 (Sep. 26, 2016), pp. 12765-12768, XP055445019, ISSN: 1359-7345, DOI: 10.1039/C6CC06786G.
International Search Report dated May 27, 2015 for related PCT Application No. PCT/CN2014/093181 by Chinese Patent Office.

*Primary Examiner* — Yun Qian
(74) *Attorney, Agent, or Firm* — Enshan Hong; VLP Law Group LLP

(57) ABSTRACT

Provided is a method for preparing a Y type molecular sieve having a high silica-to-alumina ratio, comprising: mixing deionized water, a silicon source, an aluminum source, an alkali source, and a tetraalkylammoniumcation source as a template agent to obtain an initial gel mixture; after aging the initial gel mixture at an appropriate temperature, feeding the gel mixture into a high pressure synthesis kettle for crystallization; separating a solid product, and drying to obtain the Y type molecular sieve having a high silica-to-alumina ratio. The method provides a phase-pure Y type molecular sieve having a high crystallinity, the $SiO_2/Al_2O_3$ thereof being not less than 6.

8 Claims, 2 Drawing Sheets

METHOD FOR PREPARING Y TYPE MOLECULAR SIEVE HAVING HIGH SILICA TO ALUMINA RATIO

RELATED APPLICATIONS

This is a U.S. national stage of international application No. PCT/CN2014/093181 filed on Dec. 5, 2014, which claims priority from China Patent Application No. 20140432992.5 filed on Aug. 28, 2014, the entire content of which is incorporated herein as reference.

TECHNICAL FIELD

The present disclosure pertains to the field of high-silicon Y type molecular sieve synthesis.

BACKGROUND ART

A Y type molecular sieve has a FAU topological structure and is a molecular sieve having an ultra-cage structure formed by arranging β cages according to diamond structure. At present, the Y type molecular sieve is mainly used as a catalyst and an adsorption and separation agent. Because the high-silicon Y type zeolite catalyst has the advantages of high activity, good stability, and so on, the preparation method thereof has been always a hot spot of studies.

At present, the high-silicon Y type zeolite used industrially is mainly obtained by a post-processing method, such as chemical dealuminzation, physical dealuminzation, etc., performed on Y type zeolite raw powder. However, this method for increasing the silica-to-alumina ratio by dealuminzation post-processing has a complicated procedure, high energy consumption, and high pollution. The direct method for hydrothermally/solvothermally synthesizing high-silicon Y type zeolite can avoid complicated procedure of post-processing, save a large amount of human resource and material resource, and reduce the pollution to the environment. At the meanwhile, since the hydrothermally/solvothermally synthesized high-silicon Y type zeolite has a complete crystal structure and a uniform chemical distribution, the zeolite has a better catalytic effect.

SUMMARY OF THE INVENTION

According to one aspect of the present disclosure, there is provided a method for preparing a Y type molecular sieve having a high silica-to-alumina ratio. By selecting a suitable compound containing a tetraalkyl ammonium cation as a template agent, this method prepares a Y type molecular sieve having a silica-to-alumina ratio in backbone of no less than 6, high crystallinity, high activity, and good stability.

The method for preparing a Y type molecular sieve is characterized in that a Y type molecular sieve is prepared by using a compound containing a tetraalkylammonium cation as a template agent;

the compound containing a tetraalkylammonium cation has a chemical structural formula as represented by formula (1):

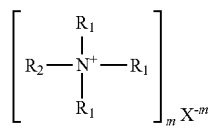

in formula (1), $R_1$, $R_2$, $R_3$, and $R_4$ are each independently selected from an alkyl group having a carbon atom number of 1 to 10; $X^{-m}$ represents an m-valent negative ion; and m is any one selected from 1, 2, and 3.

Preferably, in said formula (1), $R_1$, $R_2$, $R_3$, and $R_4$ are each independently selected from an alkyl group having a carbon atom number of 1 to 5; $X^{-m}$ is at least one selected from the group consisting of $OH^-$, $BF_4^-$, $F^-$, $Cl^-$, $Br^-$, $I^-$, $NO_3^-$, $H_2PO_4^-$, $HPO_3^{2-}$, $PO_3^{3-}$, $SO_4^{2-}$, and $HSO_4^-$.

Preferably, in said formula (1), $R_1$, $R_2$, $R_3$, and $R_4$ are the same alkyl groups.

Preferably, in said formula (1), $R_1$, $R_2$, $R_3$, and $R_4$ are all ethyl groups.

The alkyl group having a carbon atom number of 1 to 10 is a group formed from any alkane having a carbon atom number of 1 to 10 by losing any one of hydrogen atoms; and the any alkane having a carbon atom number of 1-10 is optionally selected from a linear alkane, a branched alkane, and a cycloalkane.

Preferably, the compound containing a tetraalkylammonium cation is at least one selected from the group consisting of tetraethylammonium hydroxide (simply referred to as TEAOH), tetraethylammonium chloride (simply referred to as TEACl), tetraethylammonium bromide (simply referred to as TEABr), tetraethylammonium iodide (simply referred to as TEAI), tetraethylammonium tetrafluoroborate (simply referred to as TEABF$_4$), tetrabutylammonium hydroxide (simply referred to as TBAOH), tetramethylammonium hydroxide (simply referred to as TMAOH), and tetrapropyl ammonium hydroxide (simply referred to as TPAOH).

According to one embodiment of the present disclosure, the method for preparing a Y type molecular sieve comprises at least the following steps:

a) mixing deionized water, a silicon source, an aluminum source, an alkali source, and the compound containing a tetraalkylammonium cation to obtain an initial gel mixture having the following molar ratios:

$SiO_2/Al_2O_3$=6-20;

alkali source/$Al_2O_3$=1-8, wherein the mole number of the alkali source is based on the mole number of oxides of metal elements in the alkali source;

$H_2O/Al_2O_3$=100-400; and compound containing a tetraalkylammonium cation/$Al_2O_3$=0.1-6, wherein the mole number of the compound containing a tetraalkylammonium cation is based on the mole number of nitrogen element in the compound; and b) feeding the initial gel mixture obtained in step a) into a high pressure synthesis kettle, closing the kettle, performing crystallization at 70-130° C. for 1-30 days, washing, and drying to obtain the Y type molecular sieve.

In the initial gel, the mole number of the silicon source is based on the mole number of $SiO_2$; the mole number of the aluminum source is based on $Al_2O_3$; the mole number of the alkali source is based on the mole number of oxides of metal elements in the alkali source, for example, if the alkali source is sodium hydroxide, the alkali source/$Al_2O_3$=1-8 is $Na_2O/Al_2O_3$=1-8; for example, if the alkali source is potassium hydroxide, the alkali source/$Al_2O_3$=1-8 is $K_2O/Al_2O_3$=1-8; and for example, if the alkali source is sodium hydroxide and potassium hydroxide, the alkali source/$Al_2O_3$=1-8 is ($K_2O+Na_2O)/Al_2O_3$=1-8; the mole number of the compound containing a tetraalkylammonium cation is based on the mole number of nitrogen element in the compound.

Preferably, in the initial gel mixture of step a), the range of the ratio of $SiO_2/Al_2O_3$ has an upper limit optionally selected from 20, 15, and 12 and a lower limit optionally selected from 6 and 10; the range of the ratio of alkali source/$Al_2O_3$ has an upper limit optionally selected from 5, 3.5, and 2.5 and a lower limit optionally selected from 1 and 2.5; the range of the ratio of $H_2O/Al_2O_3$ has an upper limit optionally selected from 400 and 300 and a lower limit optionally selected from 100 and 220; the range of the ratio of compound containing a tetraalkylammonium cation/$Al_2O_3$ has an upper limit optionally selected from 6 and 3 and a lower limit optionally selected from 0.1, 1.0, and 1.8.

Preferably, in said step b), the initial gel mixture is aged at a temperature of no more than 50° C. for 1-100 hours and then fed into the high pressure synthesis kettle.

Preferably, in said step a), the silicon source is at least one selected from the group consisting of silica sol, activated silica, and orthosilicate; the aluminum source is at least one selected from the group consisting of sodium aluminate, activated alumina, and aluminum alkoxide; and the alkali source is sodium hydroxide and/or potassium hydroxide.

Preferably, in said step b), the initial gel mixture is aged at a temperature of 10-50° C. for 8-72 hours and then fed into the high pressure synthesis kettle.

Preferably, in said step b), the crystallization temperature is 80-120° C. and the crystallization time is 3-20 days.

Preferably, in said step b), the crystallization is performed in a static or dynamic state.

In the present disclosure, the crystallization process being performed in a static state means that the synthesis kettle charged with the initial gel mixture is left in an oven in the process of crystallization and the mixture in the synthesis kettle is not stirred.

In the present disclosure, the crystallization process being performed in a dynamic state means that the synthesis kettle charged with the initial gel mixture is in a non-static state, such as rolling, rotating, etc., in the process of crystallization; or the mixture in the synthesis kettle is stirred in the process of crystallization.

As a preferable embodiment, the method comprises the following steps:

a) mixing deionized water, a silicon source, an aluminum source, sodium hydroxide, and a compound containing a tetraethylammonium cation to obtain an initial gel mixture having the following ratios:

$SiO_2/Al_2O_3$=6-20;
$Na_2O/Al_2O_3$=1-8;
$H_2O/Al_2O_3$=100-400; and
$TEA^+/Al_2O_3$=0.1-6; and $TEA^+$ represents a tetraethylammonium cation;

b) maintaining the initial gel mixture obtained in step a) at a temperature of no more than 50° C., stirring and aging for 1-100 hours to obtain a homogeneous gel mixture;

c) feeding the homogeneous gel mixture obtained in step b) into a high pressure synthesis kettle, closing the kettle, heating to 70-130° C., and allowing crystallization to be conducted under an autogenic pressure for 3-30 days; and d) after the crystallization is complete, separating the solid product, washing with deionized water to neutral and drying, to obtain a NaY type molecular sieve having a high silica-to-alumina ratio.

The compound containing a tetraethylammonium cation is a compound of formula (1), wherein $R_1$, $R_2$, $R_3$, and $R_4$ are all ethyl groups.

The present disclosure also provides a Y type molecular sieve having a high silica-to-alumina ratio prepared by the method described above, characterized in that the silica-to-alumina ratio of the Y type molecular sieve is not less than 6.

The present disclosure also provides a NaY type molecular sieve having a high silica-to-alumina ratio prepared by the method described above, characterized in that the silica-to-alumina ratio of the NaY type molecular sieve is not less than 6.

The present disclosure has the following advantageous effects:

(1) A Y type molecular sieve having a high silica-to-alumina ratio is directly prepared by a hydrothermal process, using a compound containing a tetraalkylammonium cation as a template agent.

(2) The Y type molecular sieve prepared has a silica-to-alumina ratio of no less than 6, high crystallinity, high activity, and good stability.

DESCRIPTION OF EMBODIMENTS

Figure 1:
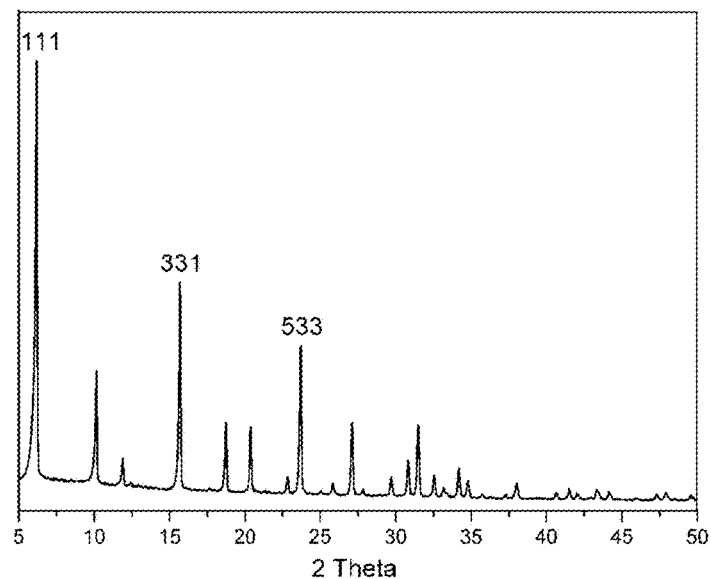
FIG. 1 is X-ray diffraction spectrum of sample 1.

The present disclosure will be described in detail below by Examples, but the present disclosure is not limited to these Examples.

In the present disclosure, the X-ray powder diffraction phase analysis (XRD) of the product is carried out on X'Pert PRO X-ray diffractometer of PANalytical Corporation, Netherlands, using a Cu target, Kα radiation source (λ=0.15418 nm), a voltage of 40 KV, and a current of 40 mA. The relative crystallinity of the product is calculated based on the sum of XRD peak intensities of crystal planes 111, 331, and 533. By comparing to the crystallinity of sample 1, which is 100%, the relative crystallinities of other samples are obtained.

In the present disclosure, SU8020 scanning electron microscope of Hitachis is used in SEM morphologic analysis of the product.

In the present disclosure, the silica-to-alumina ratio of the product is measured by using Magix 2424 X-ray fluorescence analyzer (XRF) of Philips Corporation.

In the present invention, Infinity plus 400WB solid nuclear magnetic resonance spectrum analyzer of Varian Corporation, U.S., is used in silicon nuclear magnetic resonance ($^{29}$Si MAS NMR) analysis of the product, with a BBO MAS probe and an operational magnetic field strength of 9.4 T. The silica-to-alumina ratio of the product may also be calculated from the result of $^{29}$Si MAS NMR, according to the following equation:

$$\text{NMR SiO}_2/\text{Al}_2\text{O}_3 = 8*(S_{Q0}+S_{Q1}+S_{Q2}+S_{Q3}+S_{Q4})/(S_{Q1}+2S_{Q2}+3S_{Q3}+4S_{Q4})$$

wherein Qi represents the difference in the number of aluminum atoms surrounding a silicon-oxygen tetrahedron ($SiO_4$) (i=0, 1, 2, 3, 4), and $S_{Qi}$ represents a corresponding peak area of Qi on the silicon nuclear magnetic resonance spectrum.

Example 1. Preparation of Samples 1-41

A compound containing a tetraalkylammonium cation and an alkali source were dissolved in deionized water, an aluminum source was then added and stirred until a clarified liquid was obtained; then a silicon source was further added, and an initial gel mixture was obtained after homogeneously mixing; this initial gel mixture was stirred at room temperature for 24 hours to produce a homogeneous gel mixture; and this homogeneous gel mixture was transferred to a stainless high pressure synthesis kettle.

The high pressure synthesis kettle was closed and placed in an oven, and crystallization was performed under an autogenic pressure for a period of time. After the crystallization was complete, the solid product was separated by centrifugation, washed with deionized water to neutral, and then dried in air at 100° C. to obtain a sample.

Nos. of the obtained samples, types and molar amounts of respective raw materials, crystallization temperature, and crystallization time, were detailed shown in Table 1.

TABLE 1

| Sample No. | Type and amount of compound containing tetra-alkylammonium cation | Aluminum source and mole number of $Al_2O_3$ contained | Silicon source and mole number $SiO_2$ contained | Alkali source and mole number of $Na_2O/K_2O$ contained | $H_2O$ | Crystallization temperature (° C.) | Crystallization time (day) | Type of crystal structure | Relative crystallinity (%) | XRF ($SiO_2$/$Al_2O_3$) | NMR ($SiO_2$/$Al_2O_3$) |
|---|---|---|---|---|---|---|---|---|---|---|---|
| 1 | TEAOH 0.18 mol | Sodium aluminate 0.10 mol | Silica sol 1.2 mol | NaOH 0.25 mol | 22 mol | 110 | 7 | Y type molecular sieve | 100 | 7.2 | 6.9 |
| 2 | TEAOH 0.01 mol | Sodium aluminate 0.10 mol | Silica sol 1.2 mol | NaOH 0.5 mol | 22 mol | 110 | 7 | Y type molecular sieve | 100 | 6.5 | 6.3 |
| 3 | TEAOH 0.18 mol | Sodium aluminate 0.10 mol | Silica sol 0.6 mol | NaOH 0.1 mol | 10 mol | 110 | 7 | Y type molecular sieve | 100 | 6.2 | 6.1 |
| 4 | TEAOH 0.18 mol | Sodium aluminate 0.10 mol | Silica sol 1.0 mol | NaOH 0.1 mol | 22 mol | 110 | 7 | Y type molecular sieve | 100 | 6.5 | 6.3 |
| 5 | TEAOH 0.30 mol | Sodium aluminate 0.10 mol | Silica sol 1.5 mol | NaOH 0.25 mol | 30 mol | 110 | 7 | Y type molecular sieve | 100 | 6.8 | 6.6 |
| 6 | TEAOH 0.60 mol | Sodium aluminate 0.10 mol | Silica sol 2.0 mol | NaOH 0.8 mol | 40 mol | 110 | 7 | Y type molecular sieve | 100 | 6.8 | 6.6 |
| 7 | TEAOH 0.18 mol | Sodium aluminate 0.10 mol | Silica sol 1.2 mol | NaOH 0.25 mol | 22 mol | 70 | 30 | Y type molecular sieve | 85 | 6.2 | 6.1 |
| 8 | TEAOH 0.18 mol | Sodium aluminate 0.10 mol | Silica sol 1.2 mol | NaOH 0.25 mol | 22 mol | 80 | 20 | Y type molecular sieve | 85 | 6.2 | 6.1 |
| 9 | TEAOH 0.18 mol | Sodium aluminate 0.10 mol | Silica sol 1.2 mol | NaOH 0.25 mol | 22 mol | 90 | 15 | Y type molecular sieve | 90 | 6.4 | 6.2 |
| 10 | TEAOH 0.18 mol | Sodium aluminate 0.10 mol | Silica sol 1.2 mol | NaOH 0.25 mol | 22 mol | 100 | 10 | Y type molecular sieve | 100 | 6.8 | 6.6 |
| 11 | TEAOH 0.18 mol | Sodium aluminate 0.10 mol | Silica sol 1.2 mol | NaOH 0.25 mol | 22 mol | 120 | 5 | Y type molecular sieve | 100 | 7.2 | 6.9 |
| 12 | TEAOH 0.18 mol | Sodium aluminate 0.10 mol | Silica sol 1.2 mol | NaOH 0.25 mol | 22 mol | 130 | 1 | Y type molecular sieve | 90 | 6.5 | 6.2 |
| 13 | TEAOH 0.18 mol | Sodium aluminate 0.10 mol | Activated silica 1.2 mol | NaOH 0.25 mol | 22 mol | 110 | 7 | Y type molecular sieve | 100 | 6.8 | 6.5 |
| 14 | TEAOH 0.18 mol | Sodium aluminate 0.10 mol | Orthosilicate 1.2 mol | NaOH 0.25 mol | 22 mol | 110 | 7 | Y type molecular sieve | 100 | 6.8 | 6.5 |
| 15 | TEAOH 0.18 mol | Activated alumina 0.10 mol | Silica sol 1.2 mol | KOH 0.25 mol | 22 mol | 110 | 7 | Y type molecular sieve | 100 | 6.8 | 6.5 |
| 16 | TEAOH 0.18 mol | Aluminum alkoxide 0.10 mol | Silica sol 1.2 mol | KOH 0.25 mol | 22 mol | 110 | 7 | Y type molecular sieve | 100 | 6.8 | 6.5 |
| 17 | TEACl 0.18 mol | Sodium aluminate 0.10 mol | Silica sol 1.2 mol | NaOH 0.35 mol | 22 mol | 110 | 7 | Y type molecular sieve | 100 | 6.8 | 6.5 |
| 18 | TEACl 0.18 mol | Sodium aluminate 0.10 mol | Silica sol 1.2 mol | NaOH 0.5 mol | 22 mol | 110 | 7 | Y type molecular sieve | 100 | 6.2 | 6.1 |
| 19 | TEACl 0.6 mol | Sodium aluminate 0.10 mol | Silica sol 2.0 mol | NaOH 0.8 mol | 22 mol | 110 | 7 | Y type molecular sieve | 100 | 6.5 | 6.2 |
| 20 | TEACl 0.18 mol | Sodium aluminate 0.10 mol | Silica sol 1.2 mol | NaOH 0.35 mol | 22 mol | 70 | 30 | Y type molecular sieve | 80 | 6.2 | 6.1 |
| 21 | TEACl 0.18 mol | Sodium aluminate 0.10 mol | Silica sol 1.2 mol | NaOH 0.35 mol | 22 mol | 130 | 1 | Y type molecular sieve | 95 | 6.5 | 6.2 |

TABLE 1-continued

| Sample No. | Type and amount of compound containing tetra-alkylammonium cation | Aluminum source and mole number of Al$_2$O$_3$ contained | Silicon source and mole number of SiO$_2$ contained | Alkali source and mole number of Na$_2$O/K$_2$O contained | H$_2$O | Crystallization temperature (° C.) | Crystallization time (day) | Type of crystal structure | Relative crystallinity (%) | XRF (SiO$_2$/Al$_2$O$_3$) | NMR (SiO$_2$/Al$_2$O$_3$) |
|---|---|---|---|---|---|---|---|---|---|---|---|
| 22 | TEACl 0.18 mol | Sodium aluminate 0.10 mol | Activated silica 1.2 mol | NaOH 0.35 mol | 22 mol | 110 | 7 | Y type molecular sieve | 100 | 6.8 | 6.5 |
| 23 | TEACl 0.18 mol | Activated alumina 0.10 mol | Silica sol 1.2 mol | KOH 0.1 mol + NaOH 0.25 mol | 22 mol | 110 | 7 | Y type molecular sieve | 100 | 6.8 | 6.5 |
| 24 | TEABr 0.18 mol | Sodium aluminate 0.10 mol | Silica sol 1.2 mol | NaOH 0.35 mol | 22 mol | 110 | 7 | Y type molecular sieve | 100 | 6.8 | 6.5 |
| 25 | TEABr 0.18 mol | Sodium aluminate 0.10 mol | Silica sol 1.2 mol | NaOH 0.5 mol | 22 mol | 110 | 7 | Y type molecular sieve | 100 | 6.2 | 6.1 |
| 26 | TEABr 0.6 mol | Sodium aluminate 0.10 mol | Silica sol 2.0 mol | NaOH 0.8 mol | 22 mol | 110 | 7 | Y type molecular sieve | 100 | 6.5 | 6.2 |
| 27 | TEABr 0.18 mol | Sodium aluminate 0.10 mol | Silica sol 1.2 mol | NaOH 0.35 mol | 22 mol | 70 | 30 | Y type molecular sieve | 80 | 6.2 | 6.1 |
| 28 | TEABr 0.18 mol | Sodium aluminate 0.10 mol | Silica sol 1.2 mol | NaOH 0.35 mol | 22 mol | 130 | 1 | Y type molecular sieve | 95 | 6.5 | 6.2 |
| 29 | TEABr 0.18 mol | Sodium aluminate 0.10 mol | Activated silica 1.2 mol | NaOH 0.35 mol | 22 mol | 110 | 7 | Y type molecular sieve | 100 | 6.8 | 6.5 |
| 30 | TEABr 0.18 mol | Activated alumina 0.10 mol | Silica sol 1.2 mol | NaOH 0.35 mol | 22 mol | 110 | 7 | Y type molecular sieve | 100 | 6.8 | 6.5 |
| 31 | TEAI 0.18 mol | Sodium aluminate 0.10 mol | Silica sol 1.2 mol | NaOH 0.35 mol | 22 mol | 110 | 7 | Y type molecular sieve | 100 | 6.8 | 6.5 |
| 32 | TEABF$_4$ 0.18 mol | Sodium aluminate 0.10 mol | Silica sol 1.2 mol | NaOH 0.35 mol | 22 mol | 110 | 7 | Y type molecular sieve | 100 | 6.8 | 6.5 |
| 33 | TEABF$_4$ 0.18 mol | Sodium aluminate 0.10 mol | Silica sol 1.2 mol | NaOH 0.5 mol | 22 mol | 110 | 7 | Y type molecular sieve | 100 | 6.2 | 6.1 |
| 34 | TEABF$_4$ 0.6 mol | Sodium aluminate 0.10 mol | Silica sol 2.0 mol | NaOH 0.8 mol | 22 mol | 110 | 7 | Y type molecular sieve | 100 | 6.5 | 6.2 |
| 35 | TEABF$_4$ 0.18 mol | Sodium aluminate 0.10 mol | Silica sol 1.2 mol | NaOH 0.35 mol | 22 mol | 70 | 30 | Y type molecular sieve | 80 | 6.2 | 6.1 |
| 36 | TEABF$_4$ 0.18 mol | Sodium aluminate 0.10 mol | Silica sol 1.2 mol | NaOH 0.35 mol | 22 mol | 130 | 1 | Y type molecular sieve | 95 | 6.5 | 6.2 |
| 37 | TEABF$_4$ 0.18 mol | Sodium aluminate 0.10 mol | Activated silica 1.2 mol | NaOH 0.35 mol | 22 mol | 110 | 7 | Y type molecular sieve | 100 | 6.8 | 6.5 |
| 38 | TEABF$_4$ 0.18 mol | Activated alumina 0.10 mol | Silica sol 1.2 mol | NaOH 0.35 mol | 22 mol | 110 | 7 | Y type molecular sieve | 100 | 6.8 | 6.6 |
| 39 | TMAOH 0.18 mol | Sodium aluminate 0.10 mol | Silica sol 1.2 mol | NaOH 0.35 mol | 22 mol | 110 | 7 | Y type molecular sieve | 100 | 6.8 | 6.5 |
| 40 | TPAOH 0.18 mol | Sodium aluminate 0.10 mol | Silica sol 1.2 mol | NaOH 0.35 mol | 22 mol | 110 | 7 | Y type molecular sieve | 100 | 6.7 | 6.4 |
| 41 | TBAOH 0.18 mol | Sodium aluminate 0.10 mol | Silica sol 1.2 mol | NaOH 0.35 mol | 22 mol | 110 | 7 | Y type molecular sieve | 100 | 6.8 | 6.5 |
| 42 | — | Sodium aluminate 0.10 mol | Silica sol 1.2 mol | NaOH 0.35 mol | 22 mol | 110 | 7 | Y type molecular sieve | 70 | 5.4 | 5.1 |

Comparative Example 1. Preparation of Sample 42

The synthesis process, raw material formulations, and the analysis process were the same as those of Example 1, except that tetraethylammonium hydroxide was not added in the initial gel, and the obtained sample was denoted by sample 42. As for specific raw material formulations, conditions of crystallization reaction, and analytical results, details can be seen in Table 1.

Example 2. XRD Structure Characterization of Samples 1-42

Samples 1-42 were characterized using X-ray powder diffraction. The results showed that all of samples 1-42 had structural characteristics of a Y type molecular sieve. Taking sample 1 as a typical representative, the XRD diffraction data result thereof was shown in Table 2 and the XRD spectrum was shown in FIG. 1. X-ray powder diffraction data results of samples 2-42 were all similar to those in Table 2. That is, the positions and shapes of peaks were the same, and relative peak intensities fluctuated in a range of ±20% according to the change of the synthesis conditions.

The relative crystallinity of the sample was calculated based on the sum of XRD peak intensities of crystal planes 111, 331, 533. By comparing to the crystallinity of the sample 1, which was 100%, the relative crystallinities of other samples were obtained.

TABLE 2

XRD result of sample 1

| No. | 2θ | d (Å) | 100 × I/I⁰ |
|---|---|---|---|
| 1 | 6.194 | 14.26957 | 100 |
| 2 | 10.1407 | 8.72308 | 26.18 |
| 3 | 11.8979 | 7.43842 | 6.14 |
| 4 | 12.4092 | 7.13307 | 0.63 |
| 5 | 15.6745 | 5.65369 | 47.47 |
| 6 | 17.6158 | 5.0348 | 0.53 |
| 7 | 18.7174 | 4.74087 | 15.69 |
| 8 | 20.3974 | 4.35403 | 14.99 |
| 9 | 22.8376 | 3.89404 | 3.79 |
| 10 | 23.6939 | 3.7552 | 34.54 |
| 11 | 25.0653 | 3.55277 | 0.62 |
| 12 | 25.8287 | 3.44948 | 2.53 |
| 13 | 27.1013 | 3.29031 | 16.62 |
| 14 | 27.8352 | 3.20522 | 1.27 |
| 15 | 29.7052 | 3.00755 | 4.2 |
| 16 | 30.8127 | 2.90193 | 8.1 |
| 17 | 31.4627 | 2.84346 | 16.22 |
| 18 | 32.5277 | 2.75274 | 4.91 |
| 19 | 33.1534 | 2.70221 | 2.08 |
| 20 | 34.1594 | 2.6249 | 6.63 |
| 21 | 34.7572 | 2.58111 | 3.88 |
| 22 | 35.7072 | 2.51459 | 0.77 |
| 23 | 36.3146 | 2.47391 | 0.41 |
| 24 | 37.2516 | 2.41381 | 0.85 |
| 25 | 37.9873 | 2.36874 | 3.56 |
| 26 | 39.5125 | 2.28075 | 0.19 |
| 27 | 40.6606 | 2.21896 | 1.34 |
| 28 | 41.5084 | 2.17558 | 2.35 |
| 29 | 42.0199 | 2.15027 | 1.27 |
| 30 | 42.8813 | 2.10905 | 0.47 |
| 31 | 43.3394 | 2.08782 | 2.31 |
| 32 | 44.1624 | 2.0508 | 1.81 |
| 33 | 45.9746 | 1.97409 | 0.32 |

Example 3

Figure 2:
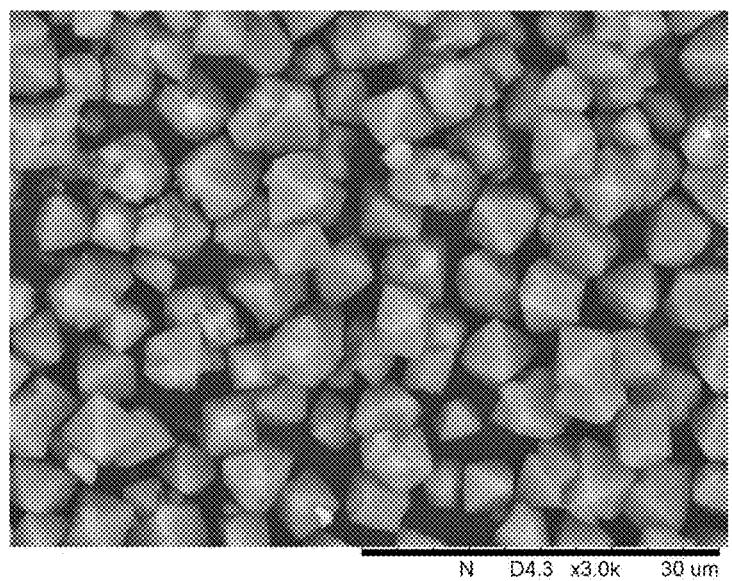
FIG. 2 is a scanning electron microscope (SEM) photograph of sample 1.

Morphological characterization was performed on samples 1-41 using a scanning electron microscope. The results showed that most of them were octahedral crystal grains and had particle sizes in a range of 0.5 μm to 30 μm. Taking sample 1 as a typical representative, it had a scanning electron microscope photograph as shown in FIG. 2 and a particle size in a range of 1 μm to 20 μm.

Example 4

The silica-to-alumina ratios of samples 1-42 were measured using an X-ray fluorescence analyzer (XRF), and details of results were shown in the column "XRF ($SiO_2/Al_2O_3$)" in Table 1.

Figure 3:
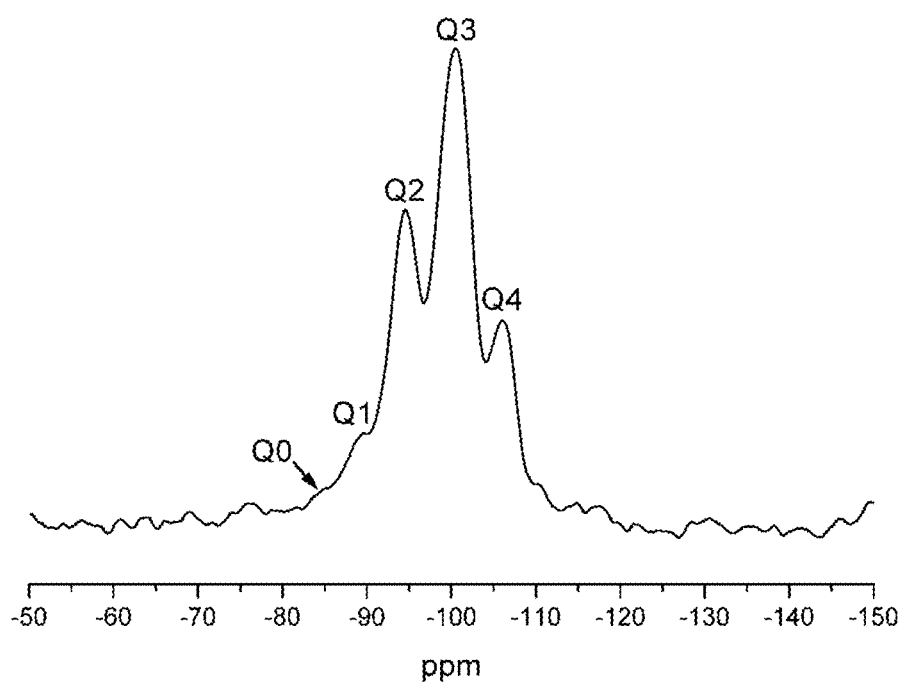
FIG. 3 is a silicon nuclear magnetic resonance spectrum ($^{29}$Si-NMR) of sample 1.

Samples 1-42 were measured using silicon nuclear magnetic resonance ($^{29}$Si MAS NMR) and the silica-to-alumina ratios in backbones were obtained by calculation, the details of results being shown in the column "NMR ($SiO_2/Al_2O_3$)" in Table 1. The results of silicon nuclear magnetic resonance spectra ($^{29}$Si-NMR) of samples 1-41 were similar, and the $^{29}$Si-NMR of sample 1 as a typical representative was shown in FIG. 3.

As seen from the results of above Table 1, all of the Y type molecular sieve samples 1-41 synthesized according to the method of the present disclosure had silica-to-alumina ratios, either silica-to-alumina ratios of the product determined by XRF method or silica-to-alumina ratios in the backbone of the product determined by silicon nuclear magnetic resonance spectrum data, of no less than 6. For sample 42 synthesized in Comparative Example without use of tetraalkylammonium cation, however, both the crystallinity and the silica-to-alumina ratio were lower than those of samples 1-41. According to the study on catalytic cracking process, the Y type molecular sieve having a high crystallinity and a high silica-to-alumina ratio can significantly improve the catalytic cracking in terms of activity and stability.

Although the present application has been disclosed as above by means of preferred examples, these examples are not intended to limit the claims. Several possible variations and modifications may be made by any person skilled in the art without departing from the concept of the present application. Therefore, the protection scope of the present application should be defined by the claims of the present application.

What is claimed is:

1. A method for preparing a Y type molecular sieve, wherein the Y type molecular sieve is prepared by using a compound containing a tetraalkylammonium cation as a template agent, the compound containing a tetraalkylammonium cation has a chemical structural formula as represented by formula (1):

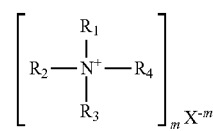

wherein, $R_1$, $R_2$, $R_3$, and $R_4$ are each independently selected from an alkyl group having a carbon atom number of 1 to 10; $X^{-m}$ represents an m-valent negative ion; and m is any one selected from 1, 2, and 3, wherein said method comprises the following steps:

a) mixing deionized water, a silicon source, an aluminum source, an alkali source, and the compound of formula (I) to obtain an initial gel mixture having the following molar ratios:

$SiO_2/Al_2O_3$=6-20;

alkali source/$Al_2O_3$=1, wherein the mole number of the alkali source is based on the mole number of oxides of metal elements in the alkali source, $H_2O/Al_2O_3$=100-400; and the compound of formula (I)/$Al_2O_3$=0.1-3, wherein the mole number of the compound of formula (I) is based on the mole number of nitrogen element in the compound of formula (I); and b) after aging the initial gel mixture obtained in step a), feeding the gel mixture into a synthesis kettle, closing the kettle, performing crystallization at 70-130° C. for 1-30 days, washing, and drying to obtain the Y type molecular sieve, wherein the Y type molecular sieve has a silica-to-alumina ration in backbone of no less than 6 and has octahedral crystal grains.

2. The method according to claim 1, wherein, in said formula (1), $R_1$, $R_2$, $R_3$, and $R_4$ are each independently selected from an alkyl group having a carbon atom number of 1 to 5; and $X^{-m}$ is at least one selected from the group consisting of $OH^-$, $BF_4^-$, $F^-$, $Cl^-$, $Br^-$, $I^-$, $NO_3^-$, $H_2PO_3^-$, $HPO_3^{2-}$, $PO_3^{3-}$, $SO_4^{2-}$, and $HSO_4^-$.

3. The method according to claim 1, wherein the compound of formula (I) is selected from the group consisting of tetraethylammonium hydroxide, tetraethylammonium chloride, tetraethylammonium bromide, tetraethylammonium iodide, tetraethylammoniumtetrafluoroborate, tetrabutyl ammonium hydroxide, tetramethylammonium hydroxide, tetrapropyl ammonium hydroxide, and combinations thereof.

4. The method according to claim 1, wherein in said step b), the initial gel mixture is aged at a temperature of no more than 50° C. for 1-100 hours and then fed into the synthesis kettle.

5. The method according to claim 1, wherein in said step a), the silicon source is selected from the group consisting of silica sol, activated silica, orthosilicate, and combinations thereof; the aluminum source is selected from the group consisting of sodium aluminate, activated alumina, aluminum alkoxide, and combinations thereof; and the alkali source is sodium hydroxide and/or potassium hydroxide.

6. The method according to claim 1, wherein in said step b), the initial gel mixture is aged at a temperature of 10-50° C. for 8-72 hours and then fed into the synthesis kettle.

7. The method according to claim 1, wherein that in said step b), the crystallization temperature is 80-120° C. and the crystallization time is 3-20 days.

8. The method according to claim 1, wherein that in said step b), the crystallization is performed in a static or dynamic state.

* * * * *